Patented Oct. 21, 1930

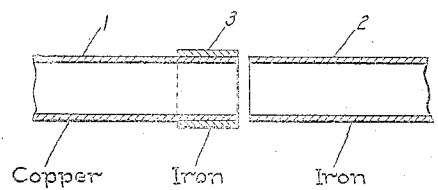

1,779,278

UNITED STATES PATENT OFFICE

GEORG KALSCHNE, OF BERLIN, GERMANY, ASSIGNOR TO GENERAL ELECTRIC COMPANY, A CORPORATION OF NEW YORK

PROCESS OF ELECTRIC WELDING

Application filed September 15, 1927, Serial No. 219,718, and in Germany September 30, 1926.

My invention relates to a method of electrically welding parts made of different materials and has as an object the performance of this operation in a manner that guarantees a successful welding together of the parts at their abutting ends by butt joints.

According to my invention I support or reinforce the abutting end of the part of the softer material projecting beyond the clamping means in such a manner as to prevent it from bulging out and away from the abutting end of the part of harder material to which it is to be joined.

My invention is of particular utility in the welding together of metal tubes formed of different materials and the drawing illustrates this application of the method.

In the drawing I have illustrated my method as applied to the welding of a copper tube 1 to an iron tube 2. Over the abutting end of the copper tube 1 which is of a softer material than the iron tube 2, I place a reinforcing ring 3 of a more resistant material than copper which may, for example, be made of iron. With the parts in the illustrated position the abutting ends of the tubes are brought together and butt welded by applying pressure and current. The ring 3 prevents the tube 1 which is of the softer material from being bent out and guarantees the production of a perfect weld. After the welding operation has been performed the ring 3 may be removed.

What I claim as new and desire to secure by Letters Patent of the United States, is:—

1. The method of electrically welding tubes of different degrees of hardness which comprises supporting the abutting end of the tube of softer material by a sleeve of more resistant material and welding the ends of said tubes together while the end of the tube of softer material is thus supported by passing current through said tubes.

2. The method of welding a copper tube to an iron tube which comprises supporting the abutting end of the copper tube by a tube of more resistant material, bringing the ends of the tubes together under pressure and passing a heavy current through the abutting ends of the tubes while the end of the copper tube is thus supported.

3. The method of electrically welding parts of different degrees of hardness, which comprises supporting the abutting end of the part of softer material by a reinforcing member of more resistant material, bringing the ends of said parts of different degrees of hardness immediately into direct engagement with one another while the end of the part of softer material is thus supported, electrically welding said parts together by passing current through them and forcing their abutting ends together, and removing said reinforcing member from said parts after the welding operation has been performed.

In witness whereof, I have hereunto set my hand this 24th day of August, 1927.

GEORG KALSCHNE.